T. G. McMAHON & G. E. FRITZ.
CURVED PIN FOR DETACHABLE CROWNS.
APPLICATION FILED JUNE 7, 1916.
1,285,758.
Patented Nov. 26, 1918.
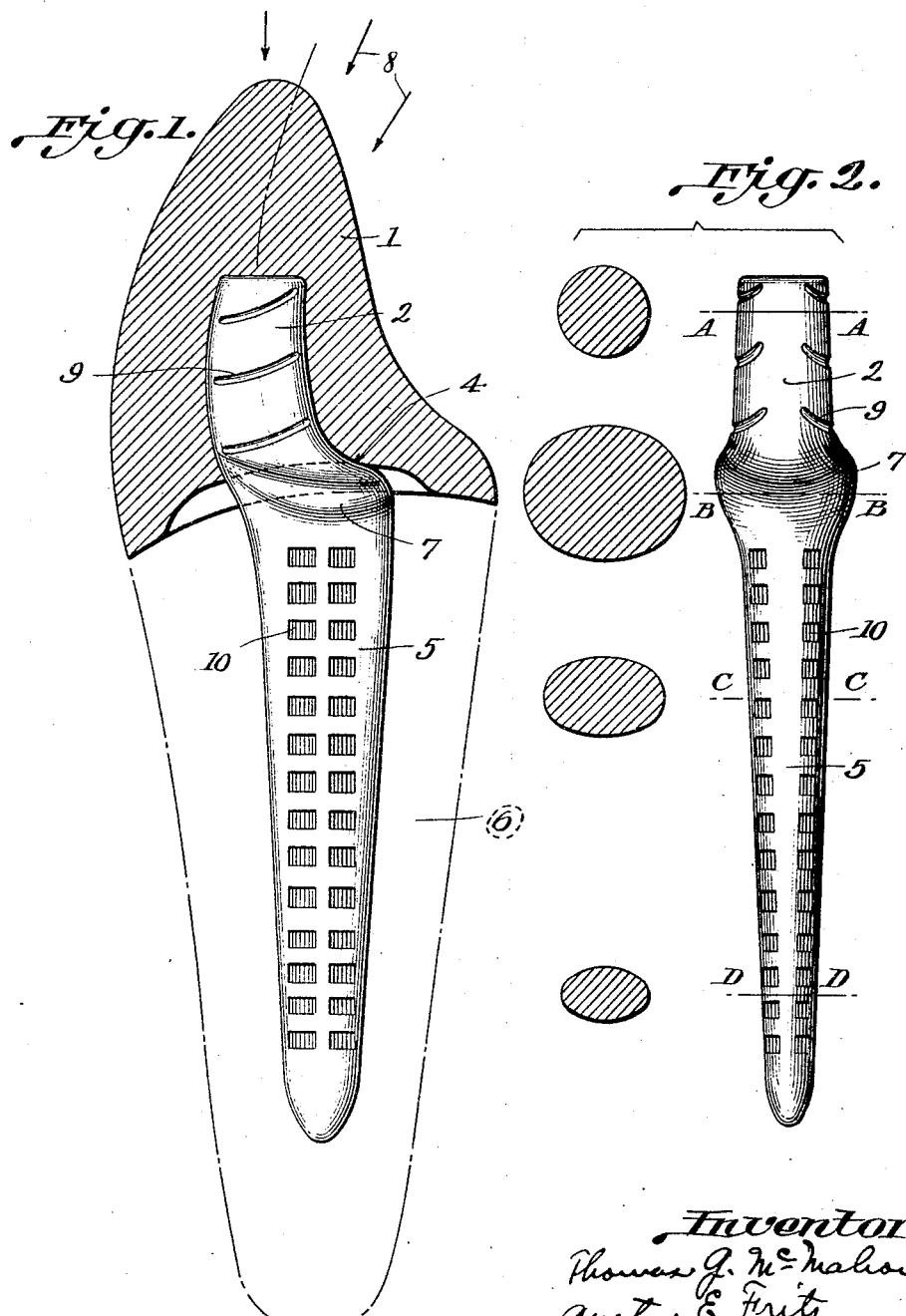
Inventors
Thomas G. McMahon
Gustav E. Fritz
By George W. Ramsey
Atty.

UNITED STATES PATENT OFFICE.

THOMAS G. McMAHON AND GUSTAV E. FRITZ, OF CHICAGO, ILLINOIS, ASSIGNORS TO THE DENTISTS' SUPPLY COMPANY, A CORPORATION OF NEW YORK.

CURVED PIN FOR DETACHABLE CROWNS.

1,285,758.     Specification of Letters Patent.     Patented Nov. 26, 1918.

Application filed June 7, 1916. Serial No. 102,256.

*To all whom it may concern:*

Be it known that we, THOMAS G. McMAHON and GUSTAV E. FRITZ, citizens of the United States, residing at Chicago, county of Cook, State of Illinois, have invented certain new and useful Improvements in Curved Pins for Detachable Crowns, of which the following is a specification.

This invention relates generally to artificial teeth, and more particularly to a special construction of pin or post for supporting a detachable or replaceable crown.

The object of the invention is to provide a construction of anchor pin for an artificial crown whereby it may be attached to the natural root, the pin having a long tapered shank for the root extended at its large end into a reverse curved portion to constitute a short shank whose end is out of alinement with the axis of the long shank, the short shank assuming a more or less central position between the lingual and labial surfaces of the crown tooth, and moreover in which the place of union between the root shank and the crown shank is laterally enlarged in a bulbous mass, giving great width and with gradual tapering walls blending into the two shank portions, but in which the tapering surface of the bulbous mass adjacent to the crown shank is more abrupt than the tapering surface which blends into the long or root shank, and said lateral extending bulbous mass in association with the intermediate reverse curved portion adjacent the juncture of the two shanks, forming a shelf for receiving the thrust of and steadying the tooth crown.

With the above and other objects in view, the nature of which will be more fully understood from the description hereinafter, the invention consists in the novel construction of anchor pin and tooth crown as hereinafter more fully described and defined in the claims.

Our invention will be better understood by reference to the drawing, in which:—

Figure 1 is a side view of our improved anchor pin with the tooth crown in section and showing the relation of the pin and crown to the tooth root.

Fig. 2 is a view looking at the front edge of the pin.

Primarily this invention is an improvement upon the pin disclosed in Letters Patent No. 1,135,007, dated April 13, 1915. The present invention resides particularly in providing a bulbous mass on the upper portion of the root shank of the pin so that the biting forces against the crown are sustained directly and securely upon the upper end of the pin. The point of greatest shear in anchoring pins of this character comes at the juncture between the crown and the tooth root and for this reason the pin is enlarged at this point to form a bulb upon the pin which effectively resists the forces mentioned. In order to enable the tooth to be more easily manipulated and set upon the upper end of the pin this portion is preferably round so that a cross-section is substantially circular. In order to construct the pin to conform to the natural nerve cavity of the tooth root and also to effectively present the greatest strength with a minimum amount of material the lower or root entering portion of the pin is oval shaped in cross-section and is narrow and tapering. To further lighten the pin, and at the same time increase the anchorage, the sides of the entering portion of the pin are provided with rows of depressions which form effective receptacles to receive cement so that when the pin is seated in a tooth root it is firmly and substantially anchored therein. The upper portion of the pin is likewise provided on its sides with transverse recesses which receive the cement utilized for holding the crown in position.

Referring now to the drawings, the porcelain crown 1 is shown as in position upon the upper end 2 of the pin and resting against the shoulder 4. The lower or tooth entering portion of the pin 5 is illustrated as being cemented within a tooth root 6 which is represented by dotted lines. It will be noted that the sides of the pin throughout its length follow rather closely and are almost parallel to the outline of the tooth and the crown. The portion below the shelf 4 and the upper part of the tapered portion 5 is expanded to form the bulb 7 which effectively resists various biting forces indicated by the arrows 8. The upper portion is provided with cement retaining recesses 9, while the lower portion is provided with cement retaining cups 10 which preferably are arranged in rows on each side of the median line of the lower part. These recesses are provided on the sides of the pin and therefore do not weaken the pin since the normal lines of force and stress do not cross or cut any recess. In order to more clearly illustrate the form of the pin cross-sections are provided as at A, B, C and D.

Realizing that the specific embodiment of our invention may be varied within the scope of the claims without departing from the spirit of the invention, we desire it to be understood that the specific construction shown is to be understood as illustrative and not in the limiting sense.

Having thus described our invention what we claim is:—

1. An anchor pin for an artificial crown tooth comprising a long tapered shank at one end and a short shank at the other end extending away from the large end of the long shank in a reverse curve so that its end is out of alinement with the axis of the long shank, the juncture of the two shanks being formed in a bulbous mass of a width greatly exceeding that of the shanks, said bulbous mass tapering gradually into the two shanks, the taper being relatively more abrupt on the part adjacent to the short shank, the said lateral projections of said bulbous mass and the intermediate reverse curved portion adjacent the juncture of the two shanks forming a shelf for receiving the thrust of and steadying the tooth crown.

2. An anchor pin for an artificial crown tooth comprising a long tapered shank at one end and a short shank at the other end extending away from the large end of the long shank in a reverse curve so that its end is out of alinement with the axis of the long shank, the juncture of the two shanks being formed in a bulbous mass of a width greatly exceeding that of the shanks, said bulbous mass tapering gradually into the two shanks, the taper being relatively more abrupt on the part adjacent to the short shank, the said lateral projections of said bulbous mass and the intermediate reverse curved portion adjacent the juncture of the two shanks forming a shelf for receiving the thrust of and steadying the tooth crown, in combination with a tooth crown having a shank aperture formed in curved shape in a plane extending from the lingual surface to the labial surface, said aperture in the tooth crown shaped to fit the shank and to receive and seat upon the bulbous portion, whereby the crown is properly positioned and the pin insured against being bent and broken.

THOMAS G. McMAHON.
GUSTAV E. FRITZ.